Dec. 7, 1926.
C. E. SUMMERS
ENGINE MUFFLER
Filed Oct. 26, 1923  2 Sheets-Sheet 1
1,609,740
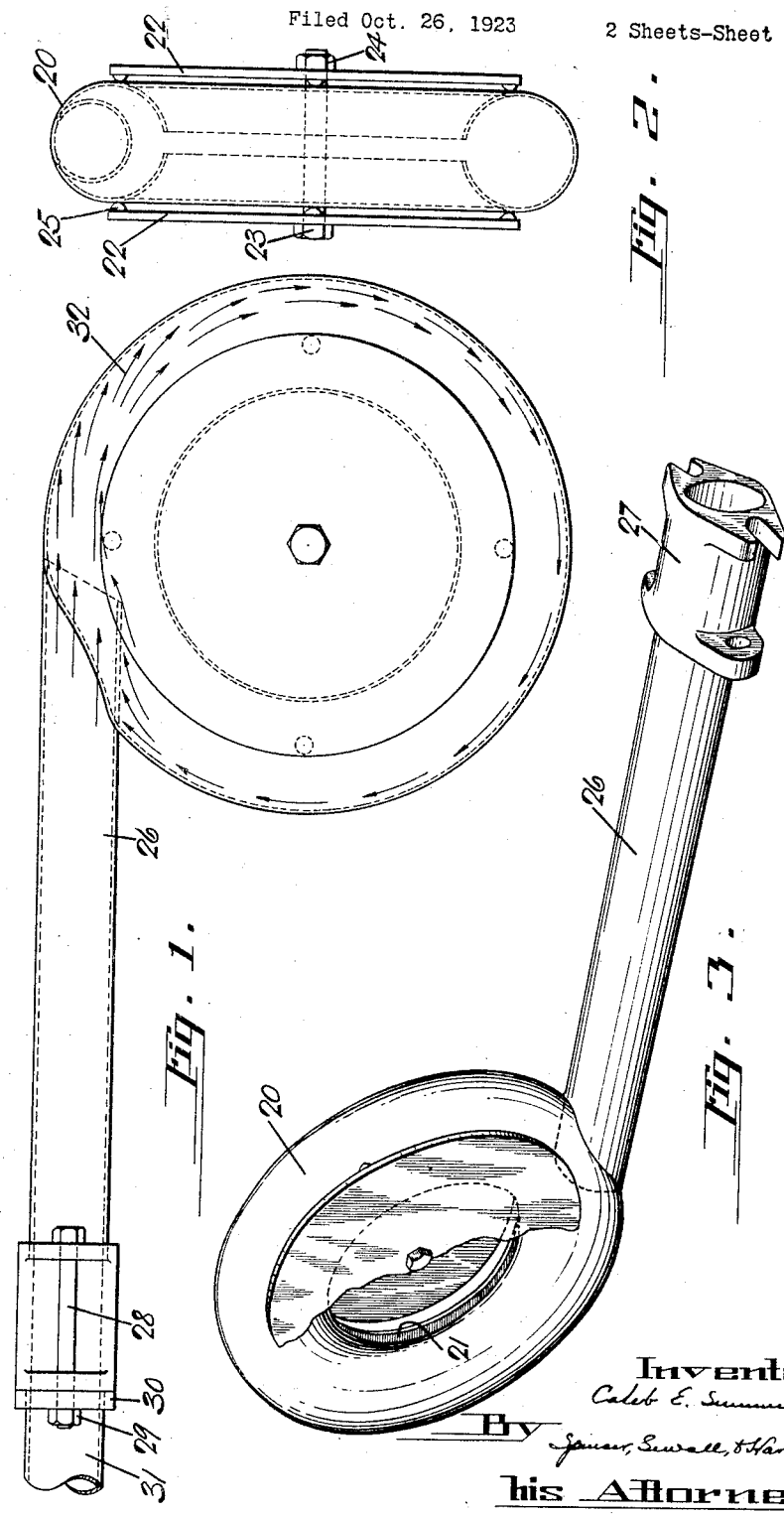
Inventor.
Caleb E. Summers
By
his Attorneys

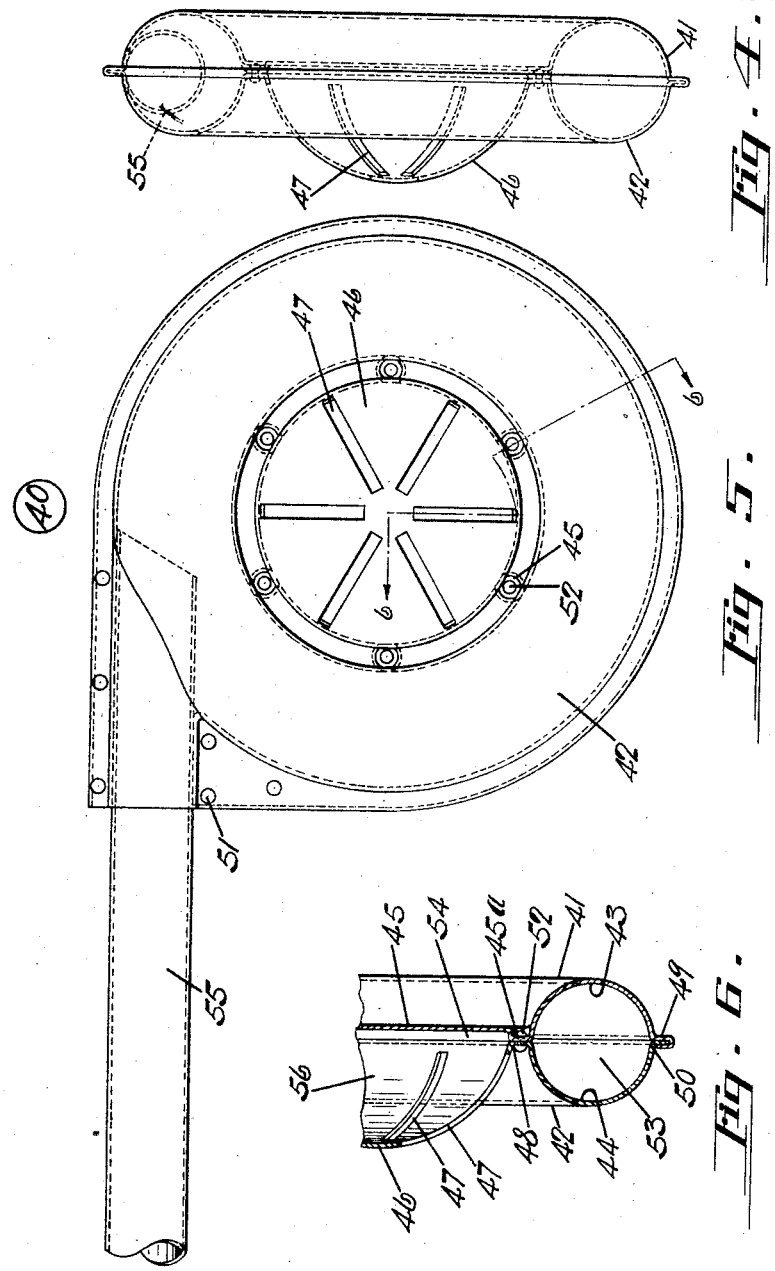

Patented Dec. 7, 1926.

1,609,740

UNITED STATES PATENT OFFICE.

CALEB E. SUMMERS, OF DAYTON, OHIO, ASSIGNOR TO GENERAL MOTORS RESEARCH CORPORATION, OF DAYTON, OHIO, A CORPORATION OF DELAWARE.

ENGINE MUFFLER.

Application filed October 26, 1923. Serial No. 670,989.

This invention relates to mufflers for internal-combustion engines and includes among its objects to muffle an engine by apparatus which is more simple in construction and effective in operation.

Further objects and advantages of the present invention will be apparent from the following description, reference being had to the accompanying drawing, wherein preferred forms of embodiments of the present invention are clearly shown.

In the drawings:

Fig. 1 is a side view of the muffler.

Fig. 2 is an end view.

Fig. 3 is a perspective view.

Fig. 4 is an edge view of a modified form of muffler.

Fig. 5 is a bottom plan view thereof.

Fig. 6 is a sectional view on the line 6—6 of Fig. 5.

The muffler comprises a hollow torus or annular tubular member 20 provided with an internal annular opening 21 continuous with the inner circumference of member 20 which provides the outlet from the annular member 20 to a central space which is located between two plates 22 clamped by means of bolt 23 and nut 24 against opposite sides of the annular member 20. Each plate is provided with feet 25 so that the plates will be spaced from the sides of the portion 20 to provide circular outlets for the muffler. The muffler inlet pipe 26 is of a smaller diameter than the diameter of the annular tube 20 and is connected tangentially therewith. A fitting 27 may be attached to the pipe 26 to cooperate with a bolt 28 and a nut 29 to connect the pipe 26 with the flanged end 30 of an engine exhaust pipe 31.

When the engine exhaust is conducted from the exhaust pipe into muffler, these exhaust gases are directed against the outer wall of the annular tube 20 as indicated by arrows 32. The pressure of the exhaust produce a whirling movement of the gases in the tube 20. Incoming gas will force the gas previously delivered to the muffler out through the opening 21 into the space between the plates 22 which further muffle the sound of the exhaust.

The whirling gas within the annular tube 20 constitutes a gaseous flywheel or rotating annulus of gaseous matter which is maintained in rotation between explosions of the engine. It is understood that this flywheel action assists in dragging exhaust gases from the pipe 26, thereby tending to reduce back pressure in the exhaust pipes 31 and 26. This continuously rotating gaseous flywheel receives the intermittent puffs of exhaust from the pipe 26 which keep the gaseous flywheel in motion. But the exit of gas from the flywheel goes on continuously and at a relatively constant rate which is conducive to muffling. It is also desirable that the tube 20 be larger in bore than the pipes 31 and 26 in order that the pressure in the exhaust will be materially reduced as it enters the muffler.

Figs. 4, 5 and 6 show another form of the invention. In these figures the muffler which is designated in its entirety by numeral 40, includes two half shell portions 41 and 42 which are formed preferably of sheet material so as to provide annular half-tubular portions 43 and 44 respectively. Within the portion 43 the shell 41 is provided with a flat web portion 45, and within the portion 44 the shell 42 is provided with a spherical web portion 46 having the apertures 47. The shell portions 41 and 42 are provided with outwardly extending flanges 49 and 50 which are attached together by means of rivets 51 and by turning the flange 49 over the flange 50. The material joining the annular portion 44 with the web portion 46 includes a flat annular portion 48. The web 45 is spaced from this portion 48 except where the web is provided with a plurality of depressions $45^a$ which engage the portion 48. The half shell portions are attached together also by rivets 52 passing through the portion 48 of the half shell 42 and the portions $45^a$ of the half shell 41. Therefore, between the rivets 52 openings 54 are provided.

The attaching of the half shell portions together in the manner described provides an annular tubular chamber 53 into which the exhaust pipe 55 enters. The exhaust gases whirling in the chamber 53 pass out the openings 54 between the rivets 52 into an approximately semi-spherical reservoir 56 between the portions 45 and 46 and thence out through the openings 47.

This form of the invention provides for manufacturing from sheet material. The muffler is preferably mounted with its annular chamber 53 in a horizontal plane and the web portions 46 extending downwardly.

The shell portion 41 can therefore be located adjacent the under surface of a horizontal support and the discharge of the muffler takes place from the under side thereof. This construction makes the muffler susceptible of mounting just below the underside of the floor of an automobile.

While the form of embodiment of the present invention as herein disclosed, constitutes a preferred form, it is to be understood that other forms might be adopted, all coming within the scope of the claim which follows:

What I claim is as follows:

An engine exhaust muffler comprising, in combination, two half shell portions each having an annular half-tubular portion, and one of which shell portions is provided with a flat imperforate web portion located within and enclosed by the outer half-tubular portion thereof; and the other of which half shell portion is provided with a central semispherical perforated web portion surrounded by the half-tubular outer portion thereof; means for attaching the half shell portions together to provide an annular tubular chamber within the outer half tubular portions, and a second chamber between the flat web portion of one and the semi-spherical portion of the other; the shell portions being constructed to provide passages between said annular tubular chamber and the chamber included between the flat web and the semi-spherical portions aforesaid.

In testimony whereof I hereto affix my signature.

CALEB E. SUMMERS.